United States Patent
Huang

(10) Patent No.: US 8,281,162 B2
(45) Date of Patent: Oct. 2, 2012

(54) ELECTRICAL POWER MANAGEMENT DEVICE

(75) Inventor: Yung-Hao Huang, SanChung (TW)

(73) Assignee: Michilin Prosperity Co., Ltd., Taipei Hsien (TW)

( * ) Notice: Subject to any disclaimer, the term of this patent is extended or adjusted under 35 U.S.C. 154(b) by 210 days.

(21) Appl. No.: 12/558,456

(22) Filed: Sep. 11, 2009

(65) Prior Publication Data

US 2010/0152912 A1 Jun. 17, 2010

Related U.S. Application Data

(63) Continuation-in-part of application No. 12/314,799, filed on Dec. 17, 2008.

(51) Int. Cl.
*G06F 1/00* (2006.01)
*G06F 1/26* (2006.01)
*G06F 1/32* (2006.01)
*G06F 11/30* (2006.01)
*G08B 13/12* (2006.01)
*G08B 13/14* (2006.01)
*G05B 15/00* (2006.01)
*G05B 11/01* (2006.01)

(52) U.S. Cl. ........ 713/300; 713/310; 713/320; 713/340; 700/1; 700/22; 340/568.2; 340/568.3

(58) Field of Classification Search ................ 700/1, 22; 439/488; 340/568.2–568.3; 713/300, 310, 713/323, 340
See application file for complete search history.

(56) References Cited

U.S. PATENT DOCUMENTS

| | | | | |
|---|---|---|---|---|
| 5,567,993 A * | 10/1996 | Jones et al. | ..................... | 307/43 |
| 6,145,048 A * | 11/2000 | Klein | ............................ | 710/264 |
| 6,288,455 B1 * | 9/2001 | Fujita | ............................ | 307/64 |
| 7,321,947 B2 * | 1/2008 | Gupta et al. | .................. | 710/302 |
| 7,340,325 B2 * | 3/2008 | Sousa et al. | .................... | 700/295 |
| 7,420,293 B2 * | 9/2008 | Donnelly et al. | ............... | 307/34 |
| 2003/0093702 A1 * | 5/2003 | Luo et al. | ..................... | 713/320 |
| 2005/0041351 A1 * | 2/2005 | Dunstan | ......................... | 361/92 |
| 2007/0150766 A1 * | 6/2007 | Kuwahara | ..................... | 713/300 |
| 2007/0200659 A1 * | 8/2007 | Kim | ............................. | 340/3.71 |
| 2008/0009177 A1 * | 1/2008 | Singer et al. | .................. | 439/488 |
| 2008/0231118 A1 * | 9/2008 | Roepke | ........................... | 307/64 |
| 2009/0295233 A1 * | 12/2009 | McGinley et al. | ............. | 307/126 |
| 2010/0038218 A1 * | 2/2010 | Fisher et al. | ............... | 200/51.02 |
| 2010/0051427 A1 * | 3/2010 | Eikum | ....................... | 200/51.02 |
| 2010/0073174 A1 * | 3/2010 | Dufour | ......................... | 340/628 |
| 2010/0146333 A1 * | 6/2010 | Yong et al. | ...................... | 714/14 |
| 2010/0175094 A1 * | 7/2010 | Ono | ................................. | 725/79 |
| 2010/0302757 A1 * | 12/2010 | Bennett, Jr. | ................... | 361/819 |
| 2011/0181114 A1 * | 7/2011 | Hodges et al. | ................. | 307/39 |

* cited by examiner

*Primary Examiner* — Ramesh Patel

(74) *Attorney, Agent, or Firm* — Venable LLP; Stefan J. Kirchanski

(57) ABSTRACT

The present invention discloses a power management device that measures the idle or standby power consumed by an attached electronic product, and then automatically and completely shuts off all power to the electronic product when that product consumes idle power for a continuous, predetermined length of time.

7 Claims, 6 Drawing Sheets

ELECTRICAL POWER MANAGEMENT DEVICE

CLAIM OF PRIORITY

This application is a continuation-in-part application of U.S. application Ser. No. 12/314,799, which was filed on Dec. 17, 2008, the contents of which are incorporated herein by reference.

BACKGROUND OF THE INVENTION

1. Area of the Art

The present invention relates generally to an electrical power management device capable of shutting off the power to an electrical product so that it does not waste power while in an idle mode, also known as standby power usage or phantom load. Specifically, this invention discloses a device that measures the phantom load for an electrical product, and then automatically and completely shuts off all power to the electrical product when it detects that the product is drawing phantom load for a continuous, predetermined length of time.

2. Description of the Background Art

Many home and other electronic products consume a certain amount of energy when turned off called phantom load, idle power, or standby power. Since most electronic products are idle for most of the time, an enormous amount of energy is thereby wasted.

Below are rough estimates of the idle power consumption of common home electronic products:

1. TV (2 sets): 10 W×2=20 W (idle 19 hr/day)
2. Stereo, DVD: 5 W (idle 21 hr/day)
3. Computer and peripherals (including computer host, display, printer, scanner, etc): 45 W (idle 21 hr/day)
4. Microwave oven: 5 W (idle 23 hr/day)
5. Washing machine: 5 W (idle 22 hr/day)
6. Various chargers: 2 W (idle 20 hr/day)
7. Air conditioner (2 sets): 5 W×2=10 W (in use 12 hr/day)
8. Rice cooker: 5 W (22 hr/day)
9. Fan: 3 W (12 hr/day)
10. Dish washer: 5 W (22 hr/day)
11. Dish dryer: 5 W (22 hr/day)

The daily idle power consumption for these products total: (20×19)+(5×21)+(45×21)+(5×23)+(5×22)+(2×20)+(10×12)+(5×22)+(3×12)+(5×22)+(5×22)=2181 W (2.181 KW). The monthly idle power consumption would be 2181×30=65430 W (65.430 KW) with a yearly idle power consumption of 65430×12=785160 W (785.160 KW)=785.160 units of electrical power.

If each unit of electrical power is NT$3.465, the idle power consumption each year would cost 785.16×3.465=NT$2720.58.

This needless waste not only increases consumers' utility costs, but also results in increased carbon production which has an adverse impact on the environment.

According to a formula of Taiwan Power Company (TPC), the wasted electrical power listed above would produce 500.728 kg of carbon dioxide.

Extrapolating the above calculation, the idle power consumption from a million families is 78,516,000 KW each year, which produces 500,727.938 tons of carbon dioxide.

Conventional ways to reduce this wasted energy include simply unplugging the electronic device, or attaching the device to a power strip, and then turning off the power strip. Both of these methods are inconvenient for they require the user to remember either to unplug the device after each use or to turn off the power strip. In addition, power strips normally support a plurality of devices so it is necessary to have a power strip with a switch for each outlet to avoid powering down the wrong device.

From the preceding descriptions, it is apparent that the devices and methods currently being used to turn off idle power have significant disadvantages and/or limitations. Thus, important aspects of the technology used in the field of invention remain amenable to useful refinement.

SUMMARY OF THE INVENTION

In light of the foregoing, it is an object of the present invention to disclose a device that measures the phantom load for an attached electronic device, and then automatically and completely shut off all power to the electronic device when it detects only the phantom load for a continuous, predetermined length of time. A wireless remote may also be linked to the product to allow a user to also manually shut down all power and then turn it back on when needed.

To achieve the objectives stated herein, the present invention includes an electrical power management device comprised of a wireless remote control and a wireless detector or power management device. The power management device is comprised of a plug, power outlet(s) for other electronic devices to plug into, a microcontroller, an RF module, and an electrical current/voltage detector. The wireless remote control is comprised of a microcontroller and an RF module.

When an electrical appliance is plugged into the power management device, the user can push a button that causes the power management device to detect and measure the phantom load or idle power after which it stores this value in memory. When the power management device is operational, the electrical appliance can be turned on. If the appliance is subsequently turned off or powers down automatically, the power management device recognizes that the appliance is now consuming only idle power (i.e., is in idle mode). After a predetermined amount of time in idle mode, e.g., 30 minutes, the power management device turns off, automatically shutting off all power, including idle power. In order for the user to turn on the appliance again, the power management device must first be turned on. For user convenience, a wireless remote control may be linked to the power management device to facilitate turning on the power management device. This is particularly useful where the electrical appliance has its own remote control as in the instance of a television set. In such a case, the wireless remote is first used to turn on the power management device. This will return the attached television set to the idle mode so that it can be turned on using the television remote control.

All of the foregoing operational principles and advantages of the present invention will be more fully appreciated upon consideration of the following detailed description with reference to the drawings.

DESCRIPTION OF THE FIGURES

The features and advantages of this invention are better understood with regard to the following drawings, description, and claims. The drawings consist of the following:

DETAILED DESCRIPTION OF THE INVENTION

The following description is provided to enable any person skilled in the art to make and use the invention and sets forth the best modes contemplated by the inventors of carrying out the invention: a device that measures the phantom load for electronic products, and automatically and completely shuts off all power to the electronic product when it detects the phantom load for a continuous, predetermined length of time.

Figure 2:
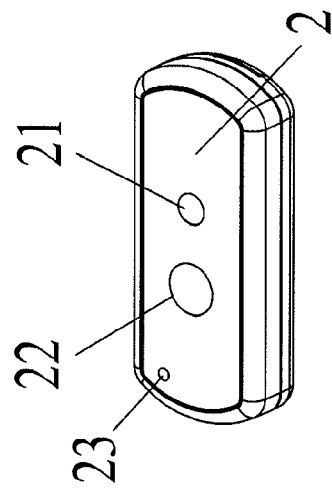
FIG. 2 is a three-dimensional view of a wireless remote control embodying features of the present invention.
Figure 1B:
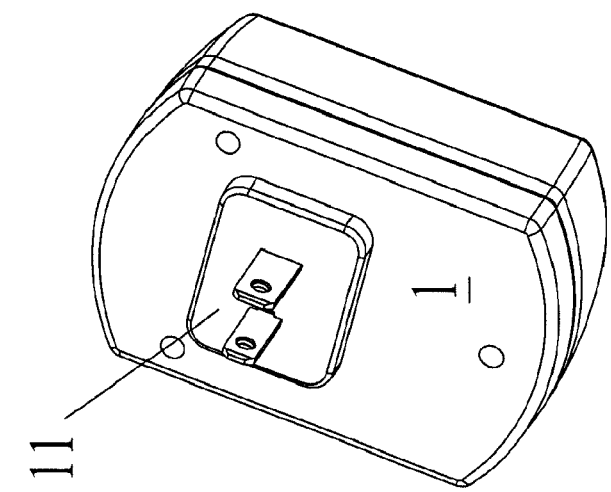
FIG. 1A and FIG. 1B are three-dimensional views of a power management device embodying features of the present invention from different perspectives.
Figure 1A:
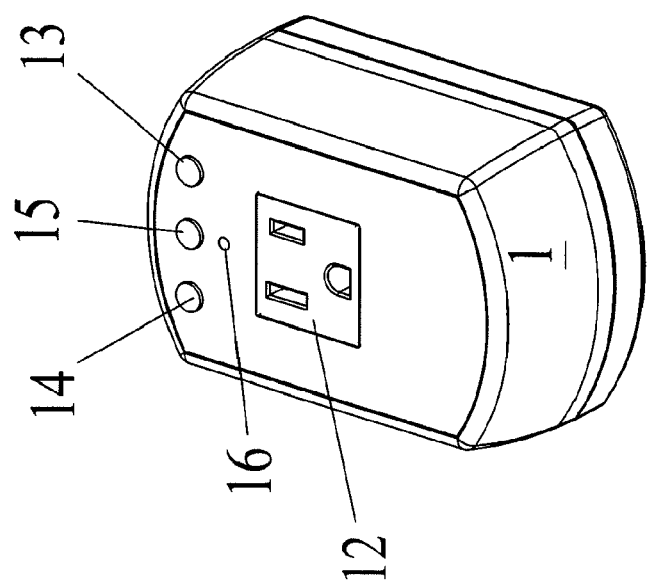

FIG. 1A and FIG. 1B are three-dimensional views of the disclosed power management device 1 from different perspectives. FIG. 2 is a three-dimensional view of the disclosed wireless remote control.

As seen in FIG. 1, the exterior of the power management device 1 is comprised of a plug 11, a power outlet 12, a connect or link key 13, an idle power preset key 14, a manual ON key 15, and a signal indicator (an LED) 16.

The essential elements inside the power management device 1 are comprised of a microcontroller (MCU), an RF module which utilizes Zigbee, or some other wireless communication protocol for wireless data transmission, and an electrical current/voltage detector.

As seen in FIG. 2, the exterior of the wireless remote control 2 is comprised of a connect or link key 21, an ON key 22, and a signal indicator (an LED) 23. The interior of the wireless remote control 2 in FIG. 2 is comprised of a microcontroller MCU and at least one RF module using Zigbee or some other wireless communication protocol for communications.

In order for the remote 2 to control the power management device 1, the remote 2 has to be initially linked to the power management device 1. In order to achieve this, the connect key 21 on the remote 2 and the connect key 13 on the power management device 1 have to be pressed simultaneously for several seconds. The signal indicator 23 will flash to indicate that the remote 2 and power management device 1 are communicating and linking. Once the remote 2 and power management device 1 are linked, the wireless remote control 2 can control the power management device 1. One of ordinary skill in the art will appreciate that this ability to link the remote 2 can readily be skipped and devices with prelinked remotes can be provided.

Either the remote ON key 22 or the power management device ON key 15 may be used to turn on the power management device 1. When it is initially turned on, the power management device 1 acts as a normal power adaptor or power strip.

In order for the power management device 1 to detect phantom load and shutoff power to an electrical device, the power management device 1 has to first measure the phantom load. In order to do this, a user plugs in an electrical appliance to the power management device outlet 12. With the power management device 1 on, and the appliance off, the user then presses the idle power preset key 14. The signal indicator 16 flashes to indicate that the power management device 1 is measuring the phantom load, and storing this value. Once this process is complete, the power management device 1 turns off.

If the user wishes to turn on the appliance, the power management device 1 must first be turned on. When the user is done using the appliance, and turns it off (or if the appliance automatically turns off), the power management device 1 recognizes that the appliance is in idle or standby mode. If it remains in idle for a predetermined amount of time, e.g. 30 minutes, the power management device 1 shuts off the power supply to the appliance resulting in zero phantom load consumption for that appliance.

It should be appreciated that the preferable amount of time before shutting off all power to a device can vary greatly depending on the device. It may make sense to shut off certain devices after a few minutes, while others may require weeks. A manual dial may be placed on the exterior of the power management device or other means can be provided so that the user can set the amount of idle time that occurs prior to shutoff.

Figure 3:
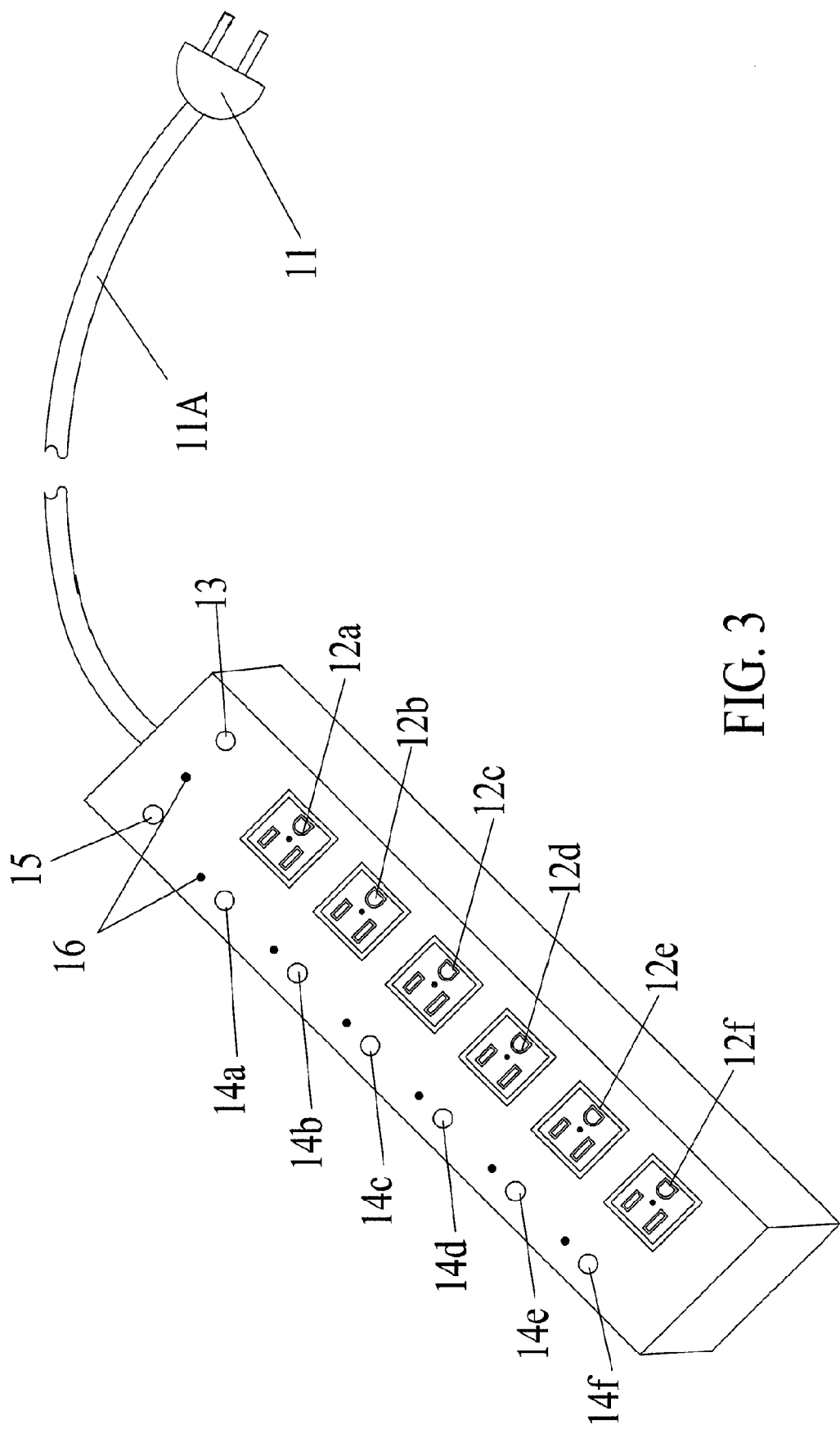
FIG. 3 is a three-dimensional view of another embodiment of a power management device embodying features of the present invention.

FIG. 3 discloses another preferred embodiment of the power management device 1. In this embodiment, the power management device 1 has an extension cord 11a and a plug 11 connected to a wall outlet and several power outlets 12a-12f for electronic products to plug in. The exterior of the wireless detector 1 has a connect key 13, a manual ON key 15, a signal indicator (an LED) 16, and idle power preset keys 14a-14f corresponding to the power outlets 12a-12f. Each of the power outlets 12a-12f or any of the idle power preset keys 14a-14f is equipped with an independent electrical current/voltage detector. An alternate embodiment may provide a separate on key 15 for each outlet so that only a single device can be powered up without affecting the other devices plugged into the power outlets 12a-12f.

Figure 4:
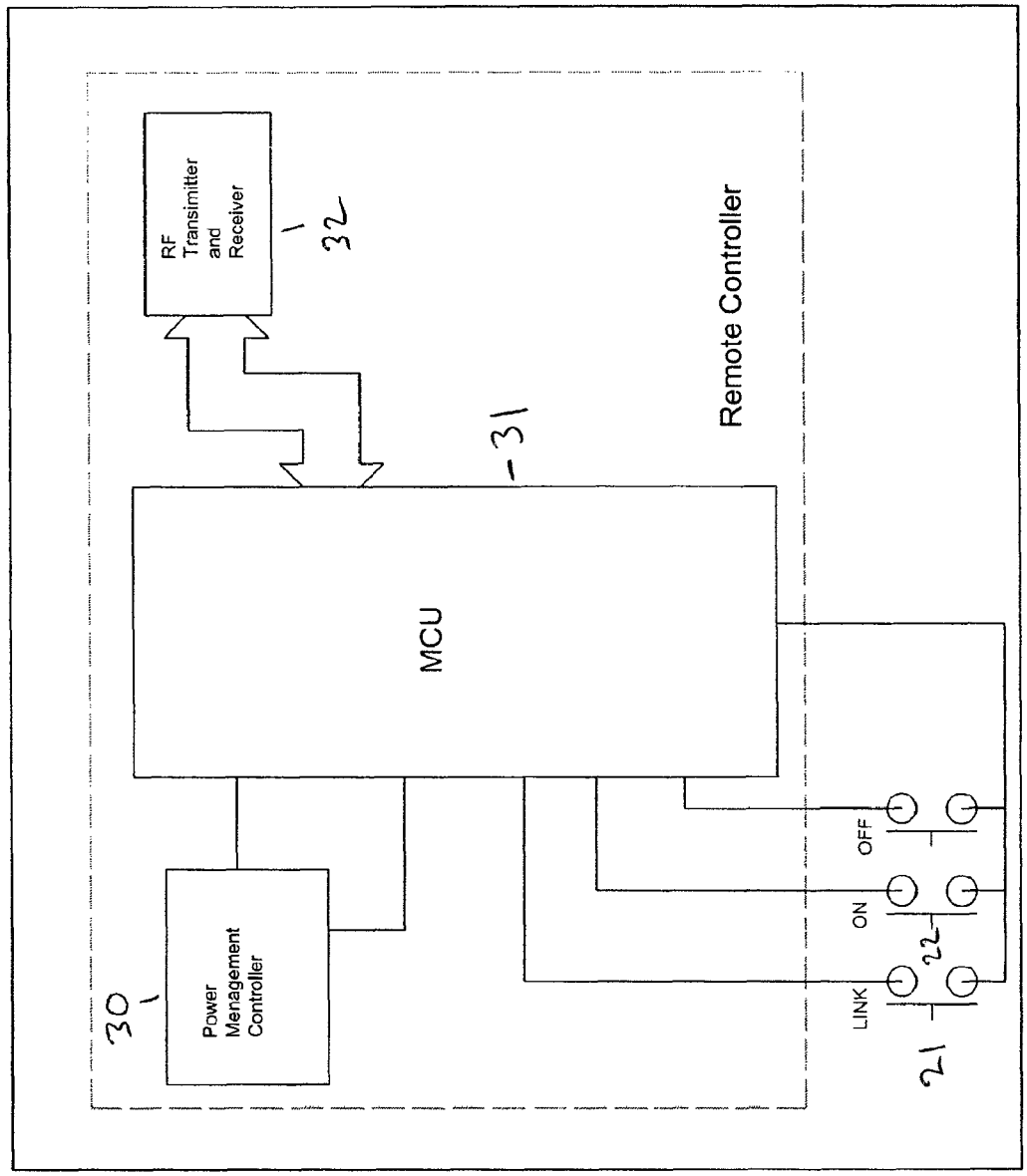
FIG. 4 is a circuit block diagram for a remote control embodying features of the present invention.

FIG. 4 discloses a circuit block diagram for the remote control 2, the principles behind and operation which are readily understood by those skilled in the art. A power management controller 30 along with a battery (not shown) provide the working voltage for the microcontroller (MCU) 31 and the RF transmitter/receiver 32.

When the link key 21 on the remote 2 is depressed, the microcontroller 31 receives and processes the signal and then controls the RF Transmitter and Receiver 32 to send out a signal which contains information regarding the remote's identification, along with a request to link with the power management device 1. Each remote 2 has a specific identification which the power management device 1 stores in its memory once they are linked in order to ensure proper communication. The power management device 1 then sends a signal back to the RF Transmitter and Receiver 32 of the remote 2 that communication has been made and the linking process has begun.

Zigbee is the preferred wireless protocol because it allows for the control of multiple device without interference. In addition, as opposed to infrared, there is no need to aim the remote 2 at the power management device 1.

Once the remote 2 and the power management device 1 are linked, the power management device 1 turns off. In order to turn on the power management device 1, the user can press the ON key 22 of the remote 2. The microcontroller 31 receives and processes the "ON" signal and then controls the RF Transmitter and Receiver 32 to communicate with the power management device 1 and then turn it on. The user can also turn off the power management device 1 with the remote 2.

Figure 5:
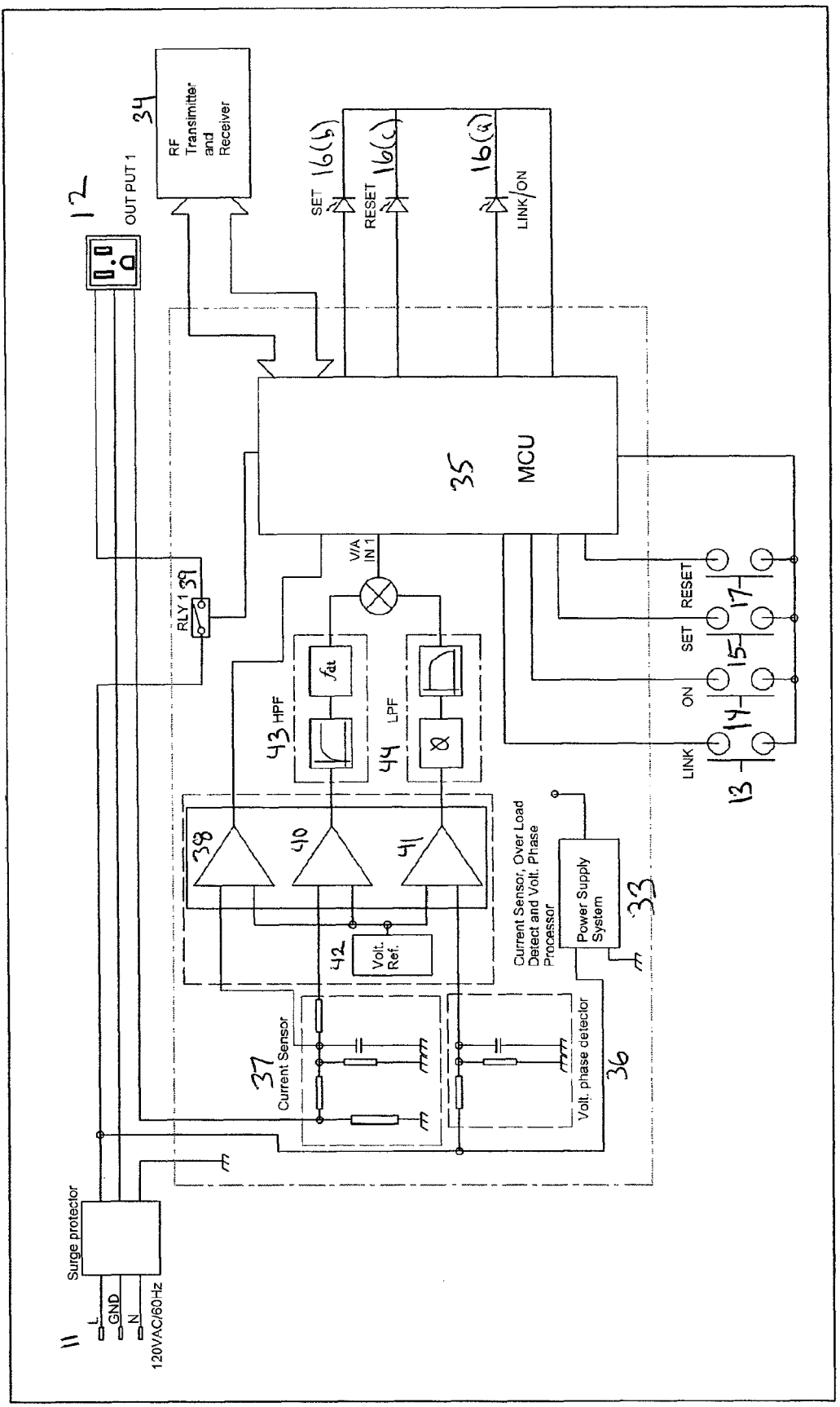
FIG. 5 is a circuit block diagram for a power management device embodying features of the present invention.

FIG. 5 discloses a circuit block diagram for the power management device 1. The circuit is arranged on a PCB inside the housing of the power management device 1. When the power management device 1 is plugged in and before the idle power is set, the power management device 1 acts as a regular power strip with a surge protector. The LED indicator 16(a)

illuminates to indicate that the power strip is on. An appliance can then be plugged into the outlet 12 and turned on.

The power management device 1 has a power supply system 33 and an RF transmitter and receiver 34 capable of receiving signals from the remote 2. When the link key 21 of the remote 2 is depressed a signal which contains information regarding the remote's identification, along with a request to link is sent to the power management device's RF transmitter and receiver 34. If the connect key 13 on the power management device was simultaneously depressed, the signal from the remote 2 is processed by the microcontroller 35 and the remote identification is stored. The power management device 1 then sends a signal back to the RF Transmitter and Receiver 32 of the remote 2 that communication has been made and the devices linked.

In order for the power management device 1 to measure phantom load, an electrical appliance that is turned off must be plugged into the power management device. When the idle preset key 14 is depressed, the voltage and current are then processed to determine the phantom load.

The voltage phase detector 36 and the current sensor 37 detect the voltage and current of the electrical appliance plugged into the outlet 12. The current sensor passes signals to the overload detector 38. If the total current exceeds 12 amps, then the microcontroller opens the relay 39, thus turning off the power. The current sensor also passes signals to the current sensor amplifier 40, which processes the current signal.

The voltage phase detector 36 passes a signal to the voltage phase amplifier 41 which processes the voltage signal. With a voltage reference 42, the current signal passes through a high pass filter 43, and the voltage signal passes through a low pass filter 44. The signals are combined to establish a voltage and current input which is processed by the microcontroller 35. The microcontroller 35 stores the measurement of the phantom load and sends a signal to the set LED 16(b) to indicate to the user that the phantom load has been set. The microcontroller 35 then opens the relay 39, which turns off the power management device.

When the user presses the remote on button or the power management device on button, the relay 39 closes and the power management device 1 continually monitors the power that the appliance consumes. If the microcontroller detects power equal to or less than the phantom load for a continuous, predetermined period, then it will open up the relay 39 and cut off all power to the appliance.

When a different appliance with a different phantom load is plugged into the power management device, the user can press reset 17 to erase the stored phantom load from memory. The control signals from the reset switch are sent directly to the microcontroller for deleting the stored phantom load, so that a new phantom load can be established. The microprocessor then sends a signal to the reset LED 16(c) to signal to the user that the power management device 1 has been reset For this one outlet embodiment, a user can plug a regular power strip into the power management device 1 and then set the total phantom load for all the devices that are plugged into the power strip. For example, a TV, DVD player, and game system can be plugged into a power strip which is then plugged into the power management device. When the TV, DVD player, and game system are turned off, the phantom load can be established by the power management device 1 as detailed above. Then, when all of the devices are off for a continuous, predetermined amount of time, the power management device detects the idle power from the power strip and shuts off power to the power strip, and thus, all devices. As long as one appliance stays on, the power supply will remain on.

Figure 6:
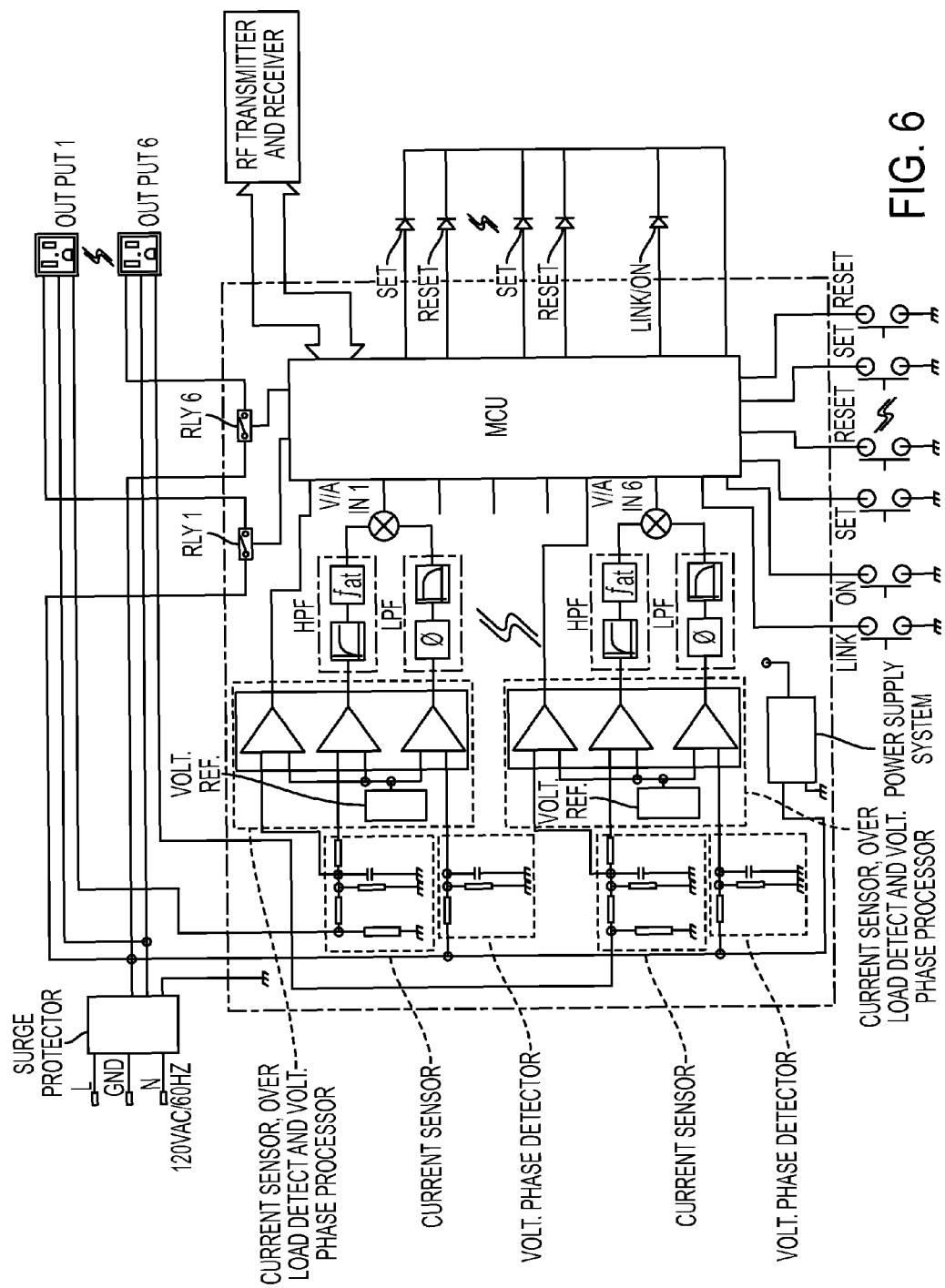
FIG. 6 is a circuit block diagram for a power management device embodying features of the present invention.

FIG. 6 discloses a circuit block diagram for another preferred embodiment of a power management device 1 comprised of multiple outlets as disclosed in FIG. 3. This embodiment allows for a user to shutoff idle power to multiple devices, independent of each other. For ease of reference, only 2 outlets are shown in the circuit diagram, the principles behind and operation of which are readily understood by those skilled in the art. Each outlet has its own set of components capable of measuring and storing phantom loads, and then detecting and turning off the power to that outlet. In this embodiment, shutoff of phantom load is outlet dependent.

For example, if a TV is plugged into outlet 1 and a DVD player is plugged into outlet 6, with the phantom load having been stored for each outlet as detailed above, then if only the TV is in use, the power management device will leave the TV on, and detect the phantom load from the DVD player. If the phantom load from the DVD player is detected for a continuous, predetermined time, e.g. 30 minutes, then the power management device will turn off all power to it. The two outlets act independent of each other with respect to shutting off phantom load. And, for any outlet where the idle has not been set, then that outlet simply acts as a normal power strip outlet which remains on whenever the power management device 1 is on.

Figure 7:
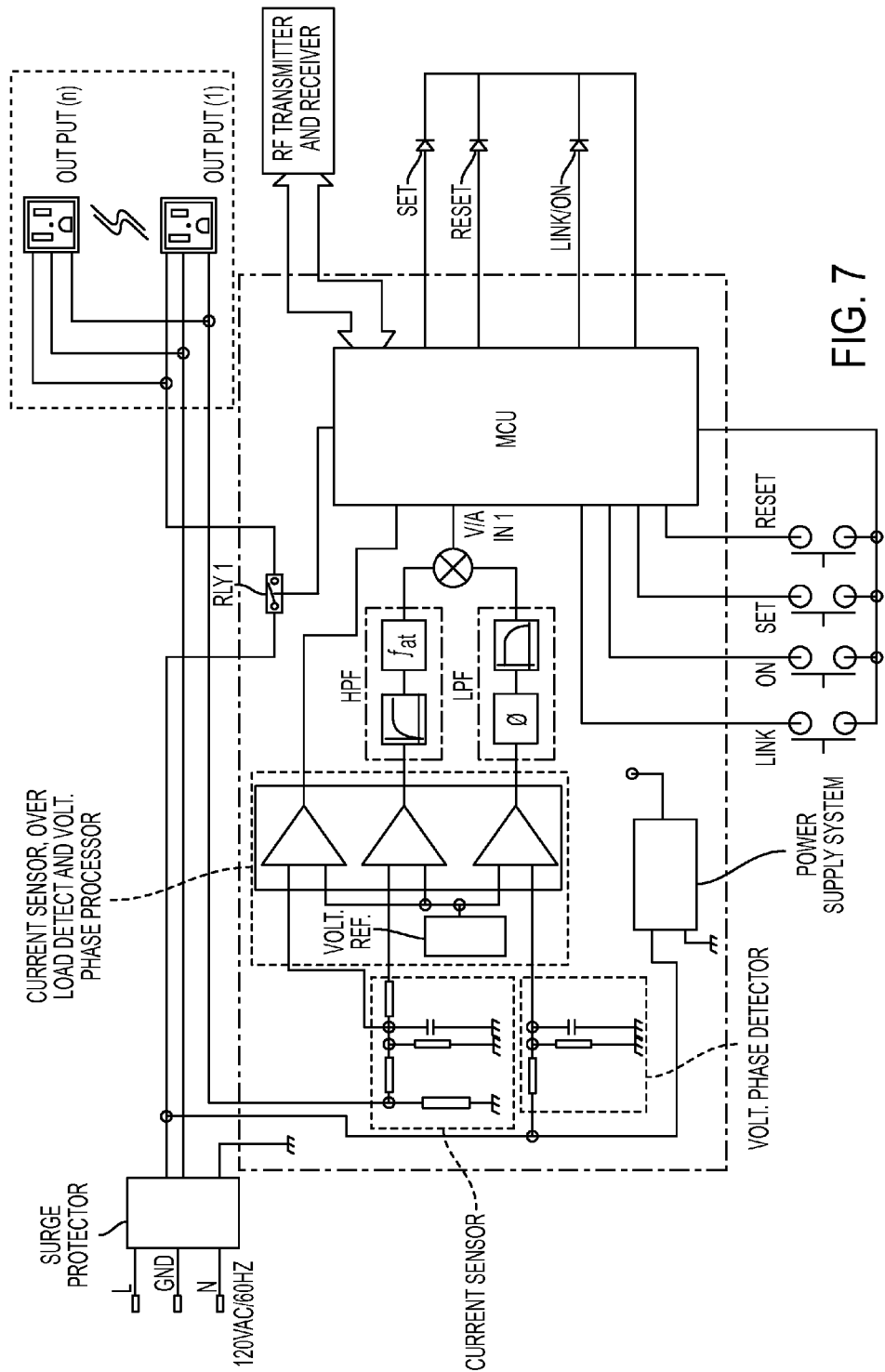
FIG. 7 is a circuit block diagram for a power management device embodying features of the present invention.

FIG. 7 discloses another embodiment where two outlets on a strip are grouped together in one circuit. In this embodiment, the phantom loads of both appliances (the combined phantom load) are measured at the same time, and then set in memory. Conceptually, this is analogous to plugging in a power strip to the power management device.

When both appliances are off for a predetermined time and only drawing the combined phantom load, then the power management device 1 shuts off all power. It should be appreciated that any number of outlets may be grouped together and then combined with any number of ungrouped outlets in one power management device.

Although the present invention has been described in detail with respect to certain preferred versions thereof, other versions are possible. Therefore, the scope of the claims should not be limited to the description of the preferred versions contained herein.

I claim:

1. A power management device comprising:
    a plug and at least one power outlet on the exterior of the power management device;
    a detector to measure a phantom load value of at least one electrical device connected to the at least one power outlet;
    a switch connecting the plug and the at least one power outlet;
    a microcontroller to store the phantom load value, wherein the microcontroller monitors the power that the at least one electrical device consumes, and turns off power to the power outlet to which the electrical device is connected by turning off the switch if the power that the electrical device consumes is equal to or less than the stored phantom load value for a continuous, predetermined amount of time.

2. The power management device of claim 1 further comprising a remote control device for causing the microcontroller to turn on or to turn off the switch.

3. The power management device of claim 2 wherein the power management device and the remote control device each bear a link key for establishing communication between the power management device and the remote control device.

4. The power management device of claim 1 further comprising an on key for turning on the switch.

5. The power management device of claim 1 further comprising a reset key for resetting the stored phantom load value.

6. The power management device of claim 1, wherein the at least one power outlet comprises a plurality of power outlets.

7. The power management device of claim 6, wherein each of the plurality of power outlets has a reset key for resetting the stored phantom load for its respective power outlet.

* * * * *